United States Patent
Li et al.

(10) Patent No.: US 12,359,745 B1
(45) Date of Patent: Jul. 15, 2025

(54) ONLINE FAULT DIAGNOSIS METHOD FOR SOLENOID VALVE BASED ON ANALYSIS OF TIME-FREQUENCY DOMAIN CHARACTERISTICS

(71) Applicants: Xiaoling Li, Beijing (CN); Shusheng Zhang, Beijing (CN); Wanzhang Wang, Beijing (CN)

(72) Inventors: Xiaoling Li, Beijing (CN); Shusheng Zhang, Beijing (CN); Wanzhang Wang, Beijing (CN)

( * ) Notice: Subject to any disclaimer, the term of this patent is extended or adjusted under 35 U.S.C. 154(b) by 0 days.

(21) Appl. No.: 19/013,870

(22) Filed: Jan. 8, 2025

(30) Foreign Application Priority Data

Aug. 7, 2024 (CN) .......................... 202411074413.4

(51) Int. Cl.
F16K 37/00 (2006.01)
(52) U.S. Cl.
CPC ................................ F16K 37/0083 (2013.01)
(58) Field of Classification Search
CPC .................................................. F16K 37/0083
See application file for complete search history.

(56) References Cited

U.S. PATENT DOCUMENTS

2023/0228644 A1* 7/2023 Hoorfar .................. G01M 3/18
73/40.5 R

FOREIGN PATENT DOCUMENTS

| CN | 103336189 A | 10/2013 |
|---|---|---|
| CN | 114722915 A | 7/2022 |
| CN | 116680611 A | 9/2023 |

\* cited by examiner

*Primary Examiner* — Shelby A Turner
*Assistant Examiner* — Yaritza H Perez Bermudez
(74) *Attorney, Agent, or Firm* — Troutman Pepper Locke LLP

(57) ABSTRACT

Provided is an online fault diagnosis method for a solenoid valve based on analysis of time-frequency domain characteristics, which relates to the technical field of solenoid valve fault diagnosis. The online fault diagnosis method for a solenoid valve based on analysis of time-frequency domain characteristics includes: acquiring timing current data of a solenoid valve drive end, and performing time domain analysis and frequency domain analysis to obtain time domain and frequency domain feature vectors, respectively, and combining the time domain and frequency domain feature vectors to obtain a complex time-frequency domain feature vector; acquiring a plurality of sets of labeled complex feature vectors by changing an operating state of a solenoid valve and then generating an isolated forest model for evaluation by majority voting; and finally, realizing online diagnosis on a fault mode of the solenoid valve.

6 Claims, 3 Drawing Sheets

Acquire present timing current data, historical normal valve core timing current data, historical spring breakage timing current data, historical stuck valve core timing current data, and historical slightly stuck valve core timing current data for a solenoid valve drive end, and preprocess the data

Perform time domain analysis and frequency domain analysis on the preprocessed present timing current data, historical normal valve core timing current data, historical spring breakage timing current data, historical stuck valve core timing current data, and historical slightly stuck valve core timing current data for the solenoid valve drive end to obtain present time domain and frequency domain feature vectors, time domain and frequency domain feature vectors for a normal valve core, time domain and frequency domain feature vectors for a broken spring, time domain and frequency domain feature vectors for a stuck valve core, and time domain and frequency domain feature vectors for a slightly stuck valve core, respectively

Perform fusion processing on the present time domain and frequency domain feature vectors, the time domain and frequency domain feature vectors for the normal valve core, the time domain and frequency domain feature vectors for the broken spring, the time domain and frequency domain feature vectors for the stuck valve core, and the time domain and frequency domain feature vectors for the slightly stuck valve core to obtain a present complex feature vector, a complex feature vector for the normal valve core, a complex feature vector for the broken spring, a complex feature vector for the stuck valve core, and a complex feature vector for the slightly stuck valve core, respectively

Establish a vector dataset based on the complex feature vector for the normal valve core, the complex feature vector for the broken spring, the complex feature vector for the stuck valve core, and the complex feature vector for the slightly stuck valve core

Train a pre-established random forest model with the vector dataset, and diagnose and identify the present complex feature vector after the completion of training the random forest model

FIG. 1

```
┌─────────────────────────────────────────────────────────────────┐
│ Construct an operating circuit in a normal working condition    │
│ and measure drive end current based on a current sensor         │
└─────────────────────────────────────────────────────────────────┘
                                 ▼
┌─────────────────────────────────────────────────────────────────┐
│ Calculate a mean value, an effective value, an extreme          │
│ difference, and a first inflection point time of current as     │
│ time domain features according to timing current values         │
└─────────────────────────────────────────────────────────────────┘
                                 ▼
┌─────────────────────────────────────────────────────────────────┐
│ Select a suitable wavelet basis function for three layers of    │
│ wavelet packet decomposition According to a second-order        │
│ derivative of the timing current, and calculate energy of each  │
│ layer as a frequency domain feature                             │
└─────────────────────────────────────────────────────────────────┘
                                 ▼
┌─────────────────────────────────────────────────────────────────┐
│ Combine a timing feature and a frequency domain feature in a    │
│ normal state into a complex feature                             │
└─────────────────────────────────────────────────────────────────┘
                                 ▼
┌─────────────────────────────────────────────────────────────────┐
│ Simulate several typical faults and record a plurality of sets  │
│ of complex feature vectors corresponding to the faults          │
└─────────────────────────────────────────────────────────────────┘
                                 ▼
┌─────────────────────────────────────────────────────────────────┐
│ Train an isolated forest model with all labeled complex         │
│ feature vectors as a dataset                                    │
└─────────────────────────────────────────────────────────────────┘
                                 ▼
┌─────────────────────────────────────────────────────────────────┐
│ Diagnose a fault mode online using the isolated forest model    │
└─────────────────────────────────────────────────────────────────┘
```

FIG. 2

ONLINE FAULT DIAGNOSIS METHOD FOR SOLENOID VALVE BASED ON ANALYSIS OF TIME-FREQUENCY DOMAIN CHARACTERISTICS

CROSS REFERENCE TO RELATED APPLICATION

This patent application claims the benefit and priority of Chinese Patent Application No. 2024110744134, filed with the China National Intellectual Property Administration on Aug. 7, 2024, the disclosure of which is incorporated by reference herein in its entirety as part of the present application.

TECHNICAL FIELD

The present disclosure relates to the technical field of solenoid valve fault diagnosis, and in particular, to an online fault diagnosis method for a solenoid valve based on analysis of time-frequency domain characteristics.

BACKGROUND

In important fields such as shipbuilding heavy industry, petrochemical engineering, national defense and military industry, and industrial equipment, solenoid valves have been extensively applied to electrohydraulic control equipment for their advantages of simple structure, low cost, low pollution, and rapid response, etc. However, due to factors such as long-term wear, corrosion, and electrolysis in a working environment, a solenoid valve is prone to being out of order, which will seriously affect the performance of a control system and even result in system down and endanger normal operation of the system. Therefore, in order to improve the security and reliability of the system, online fault diagnosis needs to be performed on the solenoid valve to ensure that faults can be found accurately and then checked and cleared.

At present, fault diagnosis methods for a solenoid valve are mainly classified into a model-driven method and a data-driven method. The model-driven method mainly includes establishing a mapping relationship between a solenoid valve fault type and a solenoid valve model parameter by simulation, tests, or by means of practical engineering experience, and further diagnosing a fault based on the mapping relationship. However, this method does not form a certain fault diagnosis standard and is significantly affect by human subjective factors. The data-driven method includes processing data based on some measurable quantities and then extracting feature vectors, and finally achieving fault diagnosis using an algorithm. For example, Shengqiao HAO et al. used sensors to measure a load pressure of a solenoid valve, flow rates of oil inlet and outlet, and a value of an opening degree, extracted feature vectors using a physical model, and finally, performed online fault diagnosis based on a support vector machine (SVM). However, this method has the disadvantages of complex operation, high difficulty of acquiring original data, and low realization possibility in engineering. In fact, current signal measurement has the advantages of low cost, large amount of information, and ease of acquisition, and can be applied to fault diagnosis of a solenoid directional valve.

An existing invention patent application No. CN201310209422.5 discloses a solenoid valve fault diagnostic method based on current detection, in which a solenoid valve front end driving current is measured based on a sensor, and subjected to wavelet energy decomposition for extracting a feature vector, and finally, fault diagnosis is performed based on a back-propagation (BP) neural network.

From the above solution, it can be found that limitations in the prior art include at least the following problems: firstly, only wavelet packet decomposition is used to process signals, and the reliability is low. Moreover, due to the reliability of fault diagnosis based on the BP neural network and the dependence on selection of initial parameters, it is difficult to apply the above solution to practical engineering. Therefore, there is an urgent need to provide a method for rapid online diagnosis of a solenoid valve fault type to ensure system security and reliability.

SUMMARY

In view of the shortcomings in the prior art, the present disclosure provides an online fault diagnosis method for a solenoid valve based on analysis of time-frequency domain characteristics. Thus, the problems of low reliability in processing signals by only using wavelet packet decomposition and the difficulty in use in practical engineering due to the reliability of fault diagnosis based on a BP neural network and the dependence on selection of initial parameters are solved.

In order to achieve the above object, the present disclosure is implemented by the following technical solutions: an online fault diagnosis method for a solenoid valve based on analysis of time-frequency domain characteristics, including the following steps: acquiring present timing current data, historical normal valve core timing current data, historical spring breakage timing current data, historical stuck valve core timing current data, and historical slightly stuck valve core timing current data for a solenoid valve drive end, and preprocessing the data; performing time domain analysis and frequency domain analysis on the preprocessed present timing current data, historical normal valve core timing current data, historical spring breakage timing current data, historical stuck valve core timing current data, and historical slightly stuck valve core timing current data for the solenoid valve drive end to obtain present time domain and frequency domain feature vectors, time domain and frequency domain feature vectors for a normal valve core, time domain and frequency domain feature vectors for a broken spring, time domain and frequency domain feature vectors for a stuck valve core, and time domain and frequency domain feature vectors for a slightly stuck valve core, respectively; performing fusion processing on the present time domain and frequency domain feature vectors, the time domain and frequency domain feature vectors for the normal valve core, the time domain and frequency domain feature vectors for the broken spring, the time domain and frequency domain feature vectors for the stuck valve core, and the time domain and frequency domain feature vectors for the slightly stuck valve core to obtain a present complex feature vector, a complex feature vector for the normal valve core, a complex feature vector for the broken spring, a complex feature vector for the stuck valve core, and a complex feature vector for the slightly stuck valve core, respectively; establishing a vector dataset based on the complex feature vector for the normal valve core, the complex feature vector for the broken spring, the complex feature vector for the stuck valve core, and the complex feature vector for the slightly stuck valve core; and training a pre-established random forest model with the vector dataset, and diagnosing and identifying the present complex feature vector after the completion of training the random forest model.

Further, the present timing current data for the solenoid valve drive end is specifically current values at a plurality of time points when the solenoid valve drive end is in a present state; the historical normal valve core timing current data for the solenoid valve drive end is specifically historical current values at a plurality of historical time points when the solenoid valve drive end is in a normal valve core state; the historical spring breakage timing current data for the solenoid valve drive end is specifically historical current values at a plurality of historical time points when the solenoid valve drive end is in a spring breakage state; the historical stuck valve core timing current data for the solenoid valve drive end is specifically historical current values at a plurality of historical time points when the solenoid valve drive end is in a stuck valve core state; and the historical slightly stuck valve core timing current data for the solenoid valve drive end is specifically historical current values at a plurality of historical time points when the solenoid valve drive end is in a slightly stuck valve core state.

Further, obtaining the present time domain feature vector, the time domain feature vector for the normal valve core, the time domain feature vector for the broken spring, the time domain feature vector for the stuck valve core, and the time domain feature vector for the slightly stuck valve core specifically includes: separately reading preprocessed current values at the plurality of time points when the solenoid valve drive end is in the present state and preprocessed historical current values at the plurality of historical time points when the solenoid valve is in the normal valve core state, in the spring breakage state, in the stuck valve core state, and in the slightly stuck valve core state, and performing mean value analysis and arrangement in a descending order on the current values to obtain a current mean value, a current effective value, a maximum current value, and a minimum current value in the present state, and current mean values, current effective values, maximum current values, and minimum current values in the normal valve core state, the spring breakage state, the stuck valve core state, and the slightly stuck valve core state, respectively; performing difference analysis on the maximum current value and the minimum current value in the present state, and the maximum current values and the minimum current values in the normal valve core state, the spring breakage state, the stuck valve core state, and the slightly stuck valve core state to obtain a current extreme difference value in the present state, and current extreme difference values in the normal valve core state, the spring breakage state, the stuck valve core state, and the slightly stuck valve core state, respectively; and establishing the present time domain feature vector, the time domain feature vector for the normal valve core, the time domain feature vector for the broken spring, the time domain feature vector for the stuck valve core, and the time domain feature vector for the slightly stuck valve core based on the current mean value, the current effective value, and the current extreme difference value in the present state, and the current mean values, the current effective values, and the current extreme difference values in the normal valve core state, the spring breakage state, the stuck valve core state, and the slightly stuck valve core state, respectively.

Further, specific formulas for calculating the current mean value, the current effective value, and the current extreme difference value in the present state are as follows:

$$\begin{cases} \bar{I} = \frac{1}{n} * (i_1 + i_2 + \cdots + i_k + \cdots + i_n) \\ I' = \sqrt{\frac{1}{n} * (i_1^2 + i_2^2 + \cdots + i_k^2 + \cdots + i_n^2)} \\ R = i^{Max} - i^{Min} \end{cases},$$

where $\bar{I}$ represents the current mean value in the present state; $i_k$ represents a current value at a k-th time point when the solenoid valve drive end is in the present state; $i_n$ represents a current value at an n-th time point when the solenoid valve drive end is in the present state, $2 < k < n$, n being a total number of time points; $I'$ represents the current effective value in the present state; R represents the current extreme difference value in the present state; $i^{Max}$ represents the maximum current in the present state; and $i^{Min}$ represents the minimum current value in the present state.

Further, obtaining the present frequency domain feature vector, the frequency domain feature vector for the normal valve core, the frequency domain feature vector for the broken spring, the frequency domain feature vector for the stuck valve core, and the frequency domain feature vector for the slightly stuck valve core specifically includes: separately reading preprocessed current values at the plurality of time points when the solenoid valve drive end is in the present state and preprocessed historical current values at the plurality of historical time points when the solenoid valve is in the normal valve core state, in the spring breakage state, in the stuck valve core state, and in the slightly stuck valve core state, and performing second derivative analysis on the current values to obtain second-order derivatives in the present state, the normal valve core state, the spring breakage state, the stuck valve core state, and the slightly stuck valve core state, respectively; performing binary discrete wavelet packet decomposition on the second-order derivatives in the present state, the normal valve core state, the spring breakage state, the stuck valve core state, and the slightly stuck valve core state to obtain wavelet functions in the present state, the normal valve core state, the spring breakage state, the stuck valve core state, and the slightly stuck valve core state, respectively; performing energy analysis on the wavelet functions in the present state, the normal valve core state, the spring breakage state, the stuck valve core state, and the slightly stuck valve core state to obtain energy values in the present state, the normal valve core state, the spring breakage state, the stuck valve core state, and the slightly stuck valve core state, respectively; and performing normalization processing on the energy values in the present state, the normal valve core state, the spring breakage state, the stuck valve core state, and the slightly stuck valve core state to obtain normalized energy features in the present state, the normal valve core state, the spring breakage state, the stuck valve core state, and the slightly stuck valve core state, respectively, which are denoted as the present frequency domain feature vector, the frequency domain feature vector for the normal valve core, the frequency domain feature vector for the broken spring, the frequency domain feature vector for the stuck valve core, and the frequency domain feature vector for the slightly stuck valve core, respectively.

Further, specific formulas for calculating the wavelet function, the energy value, and the normalized energy feature in the present state are as follows:

$$\begin{cases} \psi_{jr}(t) = \frac{1}{\sqrt{2^g}} * \psi\left(\frac{t}{2^g} - r\right) \\ X_{jt} = \int_{-\infty}^{+\infty} [\Delta i''(t) * \psi_{jt}(t)]dt \\ e_j = \sum_{r=1}^{Q} X_{jt}^2 \\ E_j = \frac{e_j}{\sqrt{\sum_{g=1}^{s} e_j}} \end{cases}$$

where $\psi_{jr}(t)$ represents a wavelet function of an r-th quantity of an j-th layer of wavelet decomposition in the present state; g represents a scale parameter of wavelet transform, g=1, 2, 3 . . . , s, s being a maximum scale, and 1≤s≤j; r represents a position parameter of wavelet transform; $\Delta i''(t)$ represents a second-order derivative in the present state; $X_{jr}$ represents a coefficient obtained by wavelet transform in the present state; $e_j$ represents an energy value of a j-th layer of wavelet decomposition in the present state, representing an energy sum of wavelet coefficients of all positions of the j-th layer, r=1, 2, 3, . . . , Q, Q being a total number of positions; and $E_j$ represents the normalized energy feature of the j-th layer of wavelet decomposition in the present state.

Further, the training a pre-established random forest model with the vector dataset specifically includes training by using a C4.5 algorithm, namely sampling the vector dataset to generate a plurality of decision-making trees to constitute the random forest model.

Further, generating the plurality of decision-making trees specifically includes: reading the vector dataset, and randomly extracting a plurality of sets of data, and separately establishing random vector datasets; dividing the random vector dataset of each set of data into a vector training dataset and a vector verifying dataset; for each set of data, segmenting the vector training dataset from a root node using a feature having a highest information gain ratio, and repeating the process for each resulting subset to establish a tree recursively; stopping establishing when a preset stop condition is met; and for the established tree, using a post-pruning strategy that is carried out after the tree has been completely established, and evaluating and adjusting the tree before and after pruning using the vector verifying dataset until the tree meets an expected standard.

Further, in the diagnosing and identifying of the present complex feature vector after the completion of training the random forest model, the random forest model diagnoses a fault by majority voting to obtain a final result.

The present disclosure has the following beneficial effects:

(1) The online fault diagnosis method for a solenoid valve based on analysis of time-frequency domain characteristics can identify and distinguish between different fault types of a solenoid valve more accurately by integrating the current data in a plurality of states and using the complex feature vectors for time-frequency domain analysis. Not only is the representational capacity of features enhanced, but also the accuracy and reliability of fault diagnosis are improved by comprehensively utilizing time domain and frequency domain information.

(2) The online fault diagnosis method for a solenoid valve based on analysis of time-frequency domain characteristics can immediately provide fault warning and maintenance recommendations by monitoring and analyzing the current characteristics of the solenoid valve in real time and using the efficient random forest model to perform online fault diagnosis. This not only helps resolve faults in time and reduce equipment downtime, but also can prevent more serious equipment damage, thereby reducing the maintenance cost and prolonging the equipment life.

(3) The online fault diagnosis method for a solenoid valve based on analysis of time-frequency domain characteristics trains the random forest model based on the C4.5 algorithm, and in combination with the post-pruning strategy, effectively avoids overfitting and improves the generalization capability of the model. The random forest is integrated with a plurality of decision-making trees such that a deviation of a single decision-making tree is reduced and the overall determination accuracy is improved by majority voting. This enables the model to maintain efficient diagnostic performance even when facing a varying working environment and different fault types.

Certainly, the implementation of any product in the present disclosure does not necessarily need to achieve all of the above advantages.

BRIEF DESCRIPTION OF THE DRAWINGS

FIG. 1 is a flowchart of an online fault diagnosis method for a solenoid valve based on analysis of time-frequency domain characteristics according to the present disclosure;

FIG. 2 is a flowchart of example steps of an online fault diagnosis method for a solenoid valve based on analysis of time-frequency domain characteristics according to the present disclosure.

DETAILED DESCRIPTION OF THE EMBODIMENTS

Figure 3:
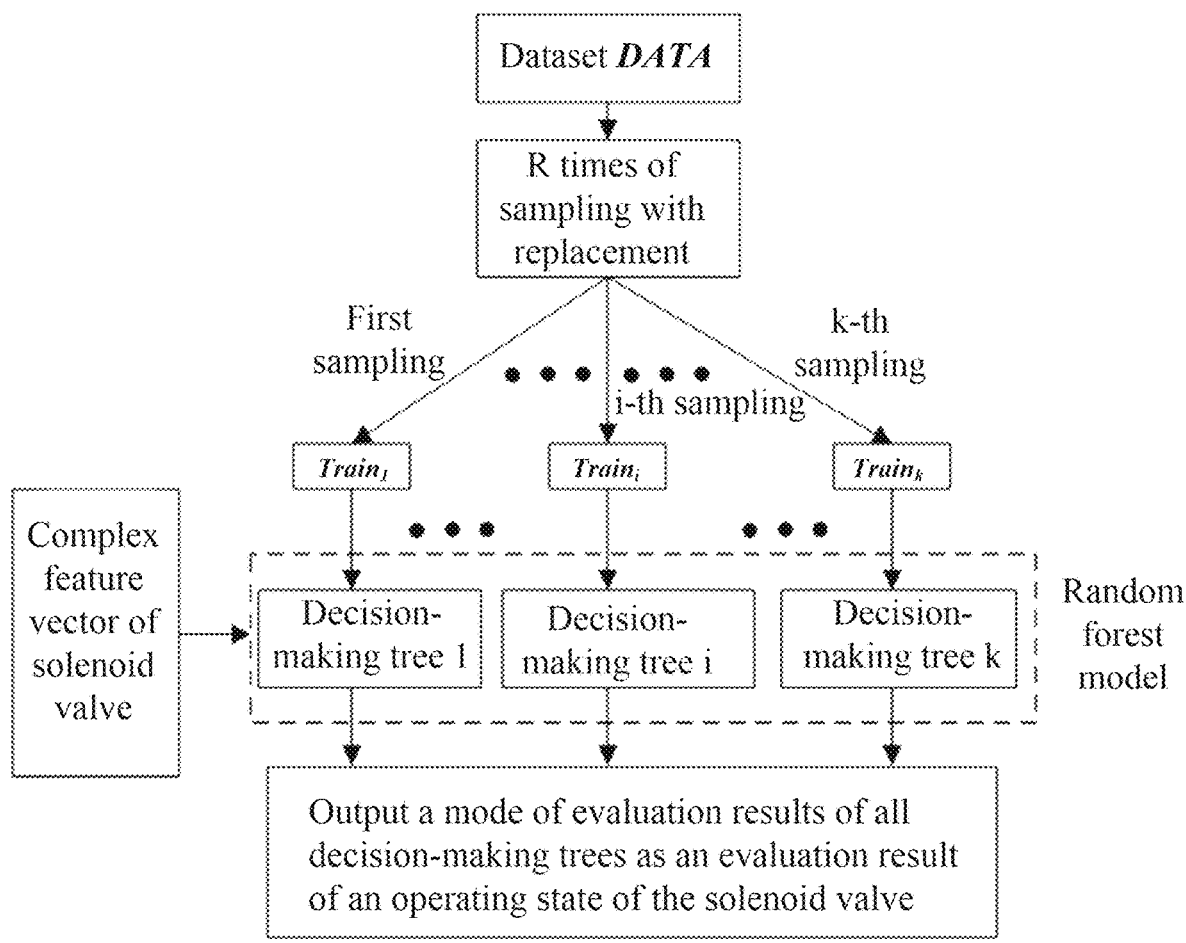
FIG. 3 is a flowchart of random forest training and evaluation of an online fault diagnosis method for a solenoid valve based on multi-dimensional drive end current time-frequency domain features according to the present disclosure.

Embodiments of the present disclosure provide an online fault diagnosis method for a solenoid valve based on analysis of time-frequency domain characteristics. Thus, the problems of low reliability in processing signals by only using wavelet packet decomposition and the difficulty in use in practical engineering due to the reliability of fault diagnosis based on a BP neural network and the dependence on selection of initial parameters are solved.

In view of the problems in the embodiments of the present disclosure, the general ideas are as follows.

Firstly, timing current data of a solenoid valve in various working states is collected, including a present state, and historical states such as normal, spring breakage, stuck valve core, and slightly stuck valve core. These data are preprocessed, cleaned, and formatted, ensuring that the quality of the data meets an analysis requirement. Time domain analysis and frequency domain analysis are performed on the preprocessed data to extract key features such as a mean value, an effective value, a maximum value, a minimum value, and an extreme difference value of current. Then, the extracted time domain and frequency domain features are fused to form complex feature vectors. A vector dataset is established using these complex feature vectors. A random forest model is employed and trained using a decision-making tree set established based on a C4.5 algorithm. After the completion of training, fault diagnosis is performed on a new or present feature vector using the trained model.

Referring to FIG. 1, an embodiment of the present disclosure provides a technical solution: an online fault diagnosis method for a solenoid valve based on analysis of time-frequency domain characteristics, including the following steps. present timing current data, historical normal valve core timing current data, historical spring breakage timing current data, historical stuck valve core timing current data, and historical slightly stuck valve core timing current data for a solenoid valve drive end are acquired, and the data is preprocessed, where the historical normal valve core timing current data is current data measured in a normal valve core operating state of the solenoid valve set by a worker; the historical spring breakage timing current data is current data measured in a spring breakage operating state of the solenoid valve set by the worker; the historical stuck valve core timing current data is current data measured in a stuck valve core operating state of the solenoid valve set by the worker; and the historical slightly stuck valve core timing current data is current data measured in a slightly stuck valve core operating state of the solenoid valve set by the worker. Time domain analysis and frequency domain analysis are performed on the preprocessed present timing current data, historical normal valve core timing current data, historical spring breakage timing current data, historical stuck valve core timing current data, and historical slightly stuck valve core timing current data for the solenoid valve drive end to obtain present time domain and frequency domain feature vectors, time domain and frequency domain feature vectors for a normal valve core, time domain and frequency domain feature vectors for a broken spring, time domain and frequency domain feature vectors for a stuck valve core, and time domain and frequency domain feature vectors for a slightly stuck valve core, respectively. Fusion processing is performed on the present time domain and frequency domain feature vectors, the time domain and frequency domain feature vectors for the normal valve core, the time domain and frequency domain feature vectors for the broken spring, the time domain and frequency domain feature vectors for the stuck valve core, and the time domain and frequency domain feature vectors for the slightly stuck valve core to obtain a present complex feature vector, a complex feature vector for the normal valve core, a complex feature vector for the broken spring, a complex feature vector for the stuck valve core, and a complex feature vector for the slightly stuck valve core, respectively. A vector dataset is established based on the complex feature vector for the normal valve core, the complex feature vector for the broken spring, the complex feature vector for the stuck valve core, and the complex feature vector for the slightly stuck valve core. A pre-established random forest model is trained with the vector dataset, and the present complex feature vector is diagnosed and identified after the completion of training the random forest model.

Further, the present timing current data for the solenoid valve drive end is specifically current values at a plurality of time points when the solenoid valve drive end is in a present state, which are acquired by a current sensor mounted in a solenoid valve drive circuit. The historical normal valve core timing current data for the solenoid valve drive end is specifically historical current values at a plurality of historical time points when the solenoid valve drive end is in a normal valve core state, which are acquired by a current sensor mounted in the solenoid valve drive circuit. The historical spring breakage timing current data for the solenoid valve drive end is specifically historical current values at a plurality of historical time points when the solenoid valve drive end is in a spring breakage state, which are acquired by a current sensor mounted in the solenoid valve drive circuit. The historical stuck valve core timing current data for the solenoid valve drive end is specifically historical current values at a plurality of historical time points when the solenoid valve drive end is in a stuck valve core state, which are acquired by a current sensor mounted in the solenoid valve drive circuit. The historical slightly stuck valve core timing current data for the solenoid valve drive end is specifically historical current values at a plurality of historical time points when the solenoid valve drive end is in a slightly stuck valve core state, which are acquired by a current sensor mounted in the solenoid valve drive circuit.

Specifically, obtaining the present time domain feature vector, the time domain feature vector for the normal valve core, the time domain feature vector for the broken spring, the time domain feature vector for the stuck valve core, and the time domain feature vector for the slightly stuck valve core specifically includes the following steps. Preprocessed current values at the plurality of time points when the solenoid valve drive end is in the present state and preprocessed historical current values at the plurality of historical time points when the solenoid valve is in the normal valve core state, in the spring breakage state, in the stuck valve core state, and in the slightly stuck valve core state are separately read, and mean value analysis and arrangement in a descending order are performed on the current values to obtain a current mean value, a current effective value, a maximum current value, and a minimum current value in the present state, and current mean values, current effective values, maximum current values, and minimum current values in the normal valve core state, the spring breakage state, the stuck valve core state, and the slightly stuck valve core state, respectively. Difference analysis is performed on the maximum current value and the minimum current value in the present state, and the maximum current values and the minimum current values in the normal valve core state, the spring breakage state, the stuck valve core state, and the slightly stuck valve core state to obtain a current extreme difference value in the present state, and current extreme difference values in the normal valve core state, the spring breakage state, the stuck valve core state, and the slightly stuck valve core state, respectively. The present time domain feature vector, the time domain feature vector for the normal valve core, the time domain feature vector for the broken spring, the time domain feature vector for the stuck valve core, and the time domain feature vector for the slightly stuck valve core are established based on the current mean value, the current effective value, and the current extreme difference value in the present state, and the current mean values, the current effective values, and the current extreme difference values in the normal valve core state, the spring breakage state, the stuck valve core state, and the slightly stuck valve core state, respectively.

Specific formulas for calculating the current mean value, the current effective value, and the current extreme difference value in the present state are as follows:

$$\begin{cases} \overline{I} = \frac{1}{n} * (i_1 + i_2 + \cdots + i_k + \cdots + i_n) \\ I' = \sqrt{\frac{1}{n} * (i_1^2 + i_2^2 + \cdots + i_k^2 + \cdots + i_n^2)} \\ R = i^{Max} - i^{Min} \end{cases},$$

where $\overline{I}$ represents the current mean value in the present state; $i_k$ represents a current value at a k-th time point when the solenoid valve drive end is in the present state; $i_n$ represents a current value at an n-th time point when the solenoid valve drive end is in the present state, 2<k<n, n being a total number of time points; I' represents the current effective value in the present state; R represents the current extreme difference value in the present state; $i^{Max}$ represents the maximum current in the present state; and $i^{Min}$ represents the minimum current value in the present state.

Moreover, specific formulas for calculating the current mean values, the current effective values, and the current extreme difference values in the normal valve core state, the spring breakage state, the stuck valve core state, and the slightly stuck valve core state are similar to the specific formulas for calculating the current mean value, the current effective value, and the current extreme difference value in the present state.

In this embodiment, an abnormal current mode can be identified accurately by analyzing the current data of the solenoid valve in different states (such as normal, spring breakage, and stuck valve core) in detail. For example, problems possibly occurring during the operation of equipment can be effectively identified by comparing mean values, effective values, maximum values, minimum values, and extreme difference values of current. These indicators can reflect whether an anomaly occurs during the operation of the solenoid valve so as to realize early fault detection and prevent potential equipment faults. By analyzing current feature vectors (such as normal operation and various fault states) in various fault states, a detailed fault feature database may be established. Such a database can not only help accurately diagnose a current fault type, but also determine a specific cause of a fault by comparative analysis, such as whether the valve core is stuck or whether the spring is broken. The accuracy of the diagnosis is vital for subsequent repair work. Purposeless check and unwanted repair cost can be reduced. Data provided by time domain analysis can be used for establishing or optimizing a predictive maintenance model. By tracking the current data of the solenoid valve in various states for a long time, a future maintenance requirement of equipment can be predicted, and a maintenance plan and resource allocation can be optimized. For example, if data shows that a current change in a certain pattern often leads to an equipment fault, preventive maintenance may be carried out before a problem occurs, thereby avoiding expensive emergency repair and production interruption.

Specifically, obtaining the present frequency domain feature vector, the frequency domain feature vector for the normal valve core, the frequency domain feature vector for the broken spring, the frequency domain feature vector for the stuck valve core, and the frequency domain feature vector for the slightly stuck valve core specifically includes the following steps. Preprocessed current values at the plurality of time points when the solenoid valve drive end is in the present state and preprocessed historical current values at the plurality of historical time points when the solenoid valve is in the normal valve core state, in the spring breakage state, in the stuck valve core state, and in the slightly stuck valve core state are separately read, and second derivative analysis is performed on the current values to obtain second-order derivatives in the present state, the normal valve core state, the spring breakage state, the stuck valve core state, and the slightly stuck valve core state, respectively. Binary discrete wavelet packet decomposition is performed on the second-order derivatives in the present state, the normal valve core state, the spring breakage state, the stuck valve core state, and the slightly stuck valve core state to obtain wavelet functions in the present state, the normal valve core state, the spring breakage state, the stuck valve core state, and the slightly stuck valve core state, respectively. Energy analysis is performed on the wavelet functions in the present state, the normal valve core state, the spring breakage state, the stuck valve core state, and the slightly stuck valve core state to obtain energy values in the present state, the normal valve core state, the spring breakage state, the stuck valve core state, and the slightly stuck valve core state, respectively. Normalization processing is performed on the energy values in the present state, the normal valve core state, the spring breakage state, the stuck valve core state, and the slightly stuck valve core state to obtain normalized energy features in the present state, the normal valve core state, the spring breakage state, the stuck valve core state, and the slightly stuck valve core state, respectively, which are denoted as the present frequency domain feature vector, the frequency domain feature vector for the normal valve core, the frequency domain feature vector for the broken spring, the frequency domain feature vector for the stuck valve core, and the frequency domain feature vector for the slightly stuck valve core, respectively.

Specific formulas for calculating the wavelet function, the energy value, and the normalized energy feature in the present state are as follows:

$$\begin{cases} \psi_{jt}(t) = \frac{1}{\sqrt{2^g}} * \psi\left(\frac{t}{2^g} - r\right) \\ X_{jt} = \int_{-\infty}^{+\infty} [\Delta i''(t) * \psi_{jt}(t)] dt \\ e_j = \sum_{r=1}^{Q} X_{jt}^2 \\ E_j = \frac{e_j}{\sqrt{\sum_{g=1}^{s} e_j}} \end{cases}$$

where $\psi_{jr}(t)$ represents a wavelet function of an r-th quantity of an j-th layer of wavelet decomposition in the present state; g represents a scale parameter of wavelet transform, which is used to control scaling of the wavelet function; $2^g$ represents scaling up of the wavelet function on a time axis, and a greater value of g means a lower frequency resolution and a higher time resolution, g=1, 2, 3 . . . , s, s being a maximum scale, and 1≤s≤j; r represents a position parameter of wavelet transform for controlling translation of the wavelet function along the time axis and capturing a local characteristic of a signal;

$$\frac{1}{\sqrt{2^g}}$$

represents a normalization factor for ensuring that the transformed energy remains unchanged; $\Delta i''(t)$ represents a second-order derivative in the present state; $X_{jr}$ represents a coefficient obtained by wavelet transform in the present state, which reflects a correlation of a second-order derivative of current and a wavelet basis function at a corresponding scale and position; $e_j$ represents an energy value of a j-th layer of wavelet decomposition in the present state, representing an energy sum of wavelet coefficients of all positions of the j-th layer, r=1, 2, 3, . . . , Q, Q being a total number of positions; and $E_j$ represents the normalized energy feature of the j-th layer of wavelet decomposition in the present state.

Moreover, specific formulas for calculating the wavelet functions, the energy values, and the normalized energy features in the normal valve core state, the spring breakage state, the stuck valve core state, and the slightly stuck valve core state are similar to the specific formulas for calculating the wavelet function, the energy value, and the normalized energy feature in the present state.

In this embodiment, by performing wavelet transform and second-order derivative analysis on the current data of the solenoid valve, the method can effectively capture instantaneous changes and nonlinear features in current signals. It may be not easy to identify these features in conventional time sequence analysis. Wavelet transform enables location analysis of a current signal on different time scales so that even a tiny change can be detected. The sensitivity and accuracy of fault detection can be greatly improved. By analyzing the frequency domain feature vectors in different fault states, this method can accurately distinguish between faults of different types such as normal valve core, spring breakage, stuck valve core, and slightly stuck valve core. Each state has its unique frequency domain features such as changes in energy distribution and wavelet coefficient. These detailed frequency domain information helps a maintenance team with diagnosing a specific type of a fault more accurately such that a more targeted repair measure is taken. By continuously monitoring the current features of the solenoid valve and analyzing the time-frequency domain data thereof, the operating state of equipment can be known in real time, and a trend change that may cause a fault can be found in time. This method can not only facilitate real-time fault diagnosis, but also predict a maintenance requirement of the solenoid valve through long-term data analysis, thereby realizing preventive maintenance. The preventive maintenance helps avoid sudden breakdown and reduce nonscheduled down time, thereby improving the reliability and efficiency of the whole equipment.

Specifically, the pre-established random forest model is trained with the vector dataset, specifically using a C4.5 algorithm. In particular, the vector dataset is sampled to generate a plurality of decision-making trees to constitute the random forest model.

In this embodiment, the accuracy and reliability of prediction by the random forest are improved by integrating a plurality of decision-making trees. Each tree is trained with a random subset of the dataset. This integration method can significantly reduce a model variance, thereby avoiding overfitting. The C4.5 algorithm uses an information gain ratio method when establishing each tree, which may select a segmentation attribute more effectively. This further optimizes the performance of each tree and the stability of the overall model. The C4.5 algorithm natively supports processing of continuous attributes and can automatically find an optimal binary segmentation point for continuous attributes. This point is particularly valuable for solenoid valve fault diagnosis because the current data is typically continuous. Moreover, when categorical data is processed by C4.5, anterior data conversion is not needed, and learning is enabled directly on original data. The complexity of data preprocessing is reduced. The flexibility of the random forest model allows the random forest model to adapt to varying input features, and high reliability diagnosis results are given for different fault types. Since the feature selection process is optimized by the C4.5 algorithm, the model can identify a key factor causing a fault more accurately and can maintain high level performance in a complex industrial environment. The C4.5 algorithm selects a segmentation node using an information gain ratio rather than a simple information gain, avoiding a decision-making tree from selecting more categories of features and thus making the model fairer and more balanced. This is especially crucial for fault diagnosis because it ensures that the model does not neglect a potential fault evidence due to the diversity of the features.

Specifically, generating the plurality of decision-making trees specifically includes the following steps. The vector dataset is read, and a plurality of sets of data are randomly extracted; and random vector datasets are separately established. The random vector dataset of each set of data is divided into a vector training dataset and a vector verifying dataset. For each set of data, the vector training dataset is segmented from a root node using a feature having a highest information gain ratio, and the process is repeated for each resulting subset to establish a tree recursively. The C4.5 algorithm uses an information gain ratio rather than a pure information gain (which is used by an ID3 algorithm) as a criterion for selecting a segmentation feature. The information gain ratio takes an impurity level of a feature into account, helping avoid being partial to more categories of features. Entropy changes before and after a difference are calculated with an information gain, and a weighted sum of sizes of subsets after segmentation is taken into account for an intrinsic value. The establishing operation is stopped when a preset stop condition is met. The stop condition is as follows: all examples belong to a same category; there is no further information gain; and a preset maximum depth of a tree or a minimum number of samples of nodes is reached. A post-pruning strategy is used for the established tree. This strategy is carried out after the tree has been completely generated, and the tree before and after pruning is evaluated and adjusted using the vector verifying dataset. Specifically, statistical indicators such as an accuracy rate, a recall rate, and accuracy are calculated. Parts capable of improving the performance on the verification set after pruning are cut off until the tree meets an expected standard. This helps reduce overfitting and improve the generalization capability of the model.

In this embodiment, a plurality of decision-making trees are established by randomly extracting data subsets. The random forest model can significantly reduce an overfitting risk and improve the performance of the model on unseen data. The C4.5 algorithm takes an information gain ratio into account when selecting a feature for segmentation. This not only optimizes the segmentation quality, but also reduces a deviation caused by numerous values of the feature. Thus, the establishment of each tree is more reasonable, and the accuracy and robustness of the overall model are improved. The use of the C4.5 algorithm, especially the introduction of the information gain ratio to feature selection, helps the model with identifying a feature most helpful for classification more accurately and avoids a selection bias possibly caused by a simple information gain. Moreover, the information gain ratio takes a subset size after segmentation, which helps generate a more balanced tree structure. This is especially important for processing a complex dataset. By setting a plurality of stop conditions (such as reaching a maximum depth, a lower limit of a number of samples, or an information gain threshold), the growth of the tree can be effectively controlled, and a too complicated tree structure is prevented, thereby avoiding overfitting. The post-pruning strategy further optimizes the tree model. By pruning a completely grown tree, nodes which have low or no contribution to the performance improvement of the model are deleted, ensuring the conciseness and performing efficiency of the final model. The post-pruning strategy allows the model to form a decision-making basis on a large data framework first and then remove unnecessary parts by pruning. In this way, not only is the application efficiency of the model on new data improved, but also the running time and resource utilization of the model are optimized, such that the model is more efficient in practical application. In an application scenario of solenoid valve fault diagnosis, this method can accurately identify a specific fault type of equipment according to synthetic analysis of historical data and real-time data. This is of great significance for formulating a timely and effective maintenance strategy and reducing equipment down time and repair cost.

Specifically, in the diagnosing and identifying of the present complex feature vector after the completion of training the random forest model, the random forest model diagnoses a fault by majority voting to obtain a final result.

In this embodiment, the majority voting method decides a final classification output by synthesizing prediction results of all trees. Since each tree is independently trained on a different random subset of the dataset, the trees may have different prediction results for a same input. By majority voting, the model takes advantage of collective intelligence. Even though errors occur in prediction of some trees, correct prediction of other trees may compensate these errors, thereby improving the overall prediction accuracy. A single decision-making tree may be easily affected by noise in data and thus overfit, especially when the depth of the tree is very large. The random forest effectively spreads the overfitting risk by establishing a plurality of trees and using a voting mechanism. The plurality of trees cover different data perspectives. The sensitivity of the model to particular data samples is reduced such that the performance of the model on unseen data is more stable. When there is an abnormal value in the dataset or a feature distribution changes, the random forest shows higher robustness due to its integrated characteristics. The majority voting method ensures that an output of the overall model is still decided by most of the trees even though part of the trees are affected by abnormal data. Thus, the consistency and reliability of a prediction result are kept. The random forest can process a dataset having high-dimensional features without requiring dimension reduction. Each tree in the model can learn from one random feature subset of the data. This not only increases the capability of the model of processing complex data, but also enables the model to capture complex interaction between features. This can be hardly realized in a single tree or a simple model.

A specific example of an online fault diagnosis method for a solenoid valve based on analysis of time-frequency domain characteristics is as follows.

For details, see FIG. 2 and FIG. 3.

In step 1, four typical operating states of the solenoid valve are set: normal valve core, spring breakage, stuck valve core, and slightly stuck valve core, which are sequentially denoted as $C_0$, $C_1$, $C_2$ and $C_3$. A solenoid valve operating circuit in normal operation is constructed, which is caused to operate normally, and a non-contact current sensor is connected in series to a drive end to collect timing current data $i(t)=[i_1, i_2, \ldots, i_k, \ldots, i_n]$ with a sampling cycle $T_s$ and a total collection time $nT_s$.

In step 2, a mean value $\bar{I}$, an effective value $i_k$, an extreme difference R, and a first inflection point time t of timing current data $i(t)$ are calculated to generate a timing feature I:

$$\begin{cases} \bar{I} = \frac{1}{n} * (i_1 + i_2 + \cdots + i_k + \cdots + i_n) \\ I' = \sqrt{\frac{1}{n} * (i_1^2 + i_2^2 + \cdots + i_k^2 + \cdots + i_n^2)} \\ R = i^{Max} - i^{Min} \end{cases}.$$

The first inflection point time 1 needs to be obtained from an image curve plotted with the data.

Taking a certain piece of data as an example, the finally acquired timing feature vector I is as follows:

$I=[\bar{I}, I', R, t]^T$

In step 3, with N=3, binary discrete wavelet packet decomposition is performed on a second-order derivative $\Delta i''(t)$ of current, and energy is calculated by the following formula as a frequency domain feature E:

$$\begin{cases} \psi_{jt}(t) = \frac{1}{\sqrt{2^g}} * \psi\left(\frac{t}{2^g} - r\right) \\ X_{jt} = \int_{-\infty}^{+\infty} [\Delta i''(t) * \psi_{jt}(t)]dt \\ e_j = \sum_{r=1}^{Q} X_{jt}^2 \\ E_j = \frac{e_j}{\sqrt{\sum_{g=1}^{s} e_j}} \end{cases};$$

where $\psi_{jr}$ represents a wavelet function of an r-th quantity of a j-th layer of wavelet decomposition in a present state; and a wavelet basis function $\psi(t)$ is Daubechies function.

In step 4, the frequency domain feature E and time domain feature I are fused to form a complex feature vector $T_0$, and a plurality of sets are recorded:

$T_0=[\bar{I}, I', R, t, E_1, E_2, E_3, E_4, E_5, E_6, E_7, E_8]^T$.

In step 5, three typical faults of spring breakage, stuck valve core, and slightly stuck valve core are simulated, and complex feature vectors $T_1$, $T_2$, $T_3$ are formed again and recorded.

In step 5.1, the spring breakage fault is simulated and a plurality of complex feature vectors $T_1$ are recorded.

In step 5.2, the stuck valve core fault is simulated and a plurality of complex feature vectors $T_2$ are recorded.

In step 5.3, the slightly stuck valve core fault is simulated and a plurality of complex feature vectors $T_3$ are recorded.

In step 6, a plurality of labeled complex feature vectors $<T_i,C_i>$(i=0, 1, 2, 3) are used as a training set DATA:

DATA={$T_i,C_i$}

For convenience of description, the following assumption is made:

DATA =

$$\begin{bmatrix} 0.50 & 1.0 & 2.1 & 0.2 & 0.61 & 0.7 & 0.5 & 0.6 & 0.7 & 0.70 & 0.52 & 0.2 & 0 \\ 0.51 & 1.1 & 2.0 & 0.2 & 0.60 & 0.7 & 0.4 & 0.6 & 0.7 & 0.70 & 0.51 & 0.2 & 1 \\ 0.45 & 1.1 & 2.1 & 0.2 & 0.61 & 0.7 & 0.6 & 0.6 & 0.7 & 0.70 & 0.50 & 0.2 & 2 \\ 0.48 & 1.1 & 2.1 & 0.2 & 0.60 & 0.7 & 0.8 & 0.6 & 0.7 & 0.71 & 0.52 & 0.2 & 3 \\ 0.50 & 1.0 & 2.1 & 0.2 & 0.61 & 0.7 & 0.5 & 0.6 & 0.7 & 0.70 & 0.51 & 0.2 & 0 \\ 0.48 & 1.1 & 2.1 & 0.2 & 0.60 & 0.7 & 0.8 & 0.6 & 0.7 & 0.70 & 0.51 & 0.2 & 3 \end{bmatrix}.$$

In step 7, a random forest model (RF) is generated.

In step 7.1, a training dataset is sampled. For example, the training set DATA contains R sets of data. One set of data is extracted from the training set with replacement. This operation is repeated for k times to generate k decision-making trees. A training set $Train_i$ sampled may be expressed as:

$$Train_i = \begin{bmatrix} 0.50 & 1.0 & 2.1 & 0.2 & 0.61 & 0.7 & 0.5 & 0.6 & 0.7 & 0.70 & 0.5 & 0.2 & 0 \\ 0.51 & 1.1 & 2.0 & 0.2 & 0.60 & 0.7 & 0.4 & 0.6 & 0.7 & 0.70 & 0.5 & 0.2 & 1 \\ 0.45 & 1.1 & 2.1 & 0.2 & 0.61 & 0.7 & 0.6 & 0.6 & 0.7 & 0.70 & 0.5 & 0.2 & 2 \\ 0.50 & 1.0 & 2.1 & 0.2 & 0.61 & 0.7 & 0.5 & 0.6 & 0.7 & 0.70 & 0.5 & 0.2 & 0 \\ 0.48 & 1.1 & 2.1 & 0.2 & 0.60 & 0.7 & 0.8 & 0.6 & 0.7 & 0.71 & 0.52 & 0.2 & 3 \\ 0.48 & 1.1 & 2.1 & 0.2 & 0.60 & 0.7 & 0.8 & 0.6 & 0.7 & 0.71 & 0.52 & 0.2 & 3 \end{bmatrix}.$$

The remaining non-repetitive data may be used as a test set $Test_i$, with a total of k sets of $Train_i$.

In step 7.2, a decision-making tree model is established. The decision-making tree units in the random forest model are constructed by using a C4.5 algorithm in the present disclosure. A segmentation attribute is selected for the C4.5 tree by using an information gain quantity as a criterion. The generated $Train_i$ corresponds to a decision-making tree, and a total of decision-making trees are generated.

In step 7.3, a random forest classification model is established. This is a quadruple classification problem in this application scenario. A final prediction result may be obtained by majority voting. The core idea of the majority voting is voting on the prediction results of all k decision-making trees in the random forest model, and a category having the most votes is a final output category.

In step 8, the random forest model that has been trained is employed to diagnose a fault mode of the solenoid valve online. That is, a complex feature vector of the solenoid valve is imported as an input to the random forest model, and a mode of an operating state is determined by using all the decision-making trees in the model as an operating state output thereof. It is assumed that the complex feature vector $T=[0.45\ 1.1\ 2.1\ 0.2\ 0.61\ 0.7\ 0.6\ 0.6\ 0.7\ 0.70\ 0.52\ 0.21]^T$ is input.

An evaluation result given by 5 decision-making trees is as follows:

V=[2, 2, 1, 2, 2]

At this point, the input 2 is the final evaluation result, i.e., the solenoid valve has the stuck valve core fault.

To sum up, the present disclosure has at least the following effects.

Different fault types of a solenoid valve can be identified and distinguished more accurately by integrating the current data in a plurality of states and using the complex feature vectors for time-frequency domain analysis. Not only is the representational capacity of features enhanced, but also the accuracy and reliability of fault diagnosis are improved by comprehensively utilizing time domain and frequency domain information.

The method can immediately provide fault warning and maintenance recommendations by monitoring and analyzing the current characteristics of the solenoid valve in real time and using the efficient random forest model to perform online fault diagnosis. This not only helps resolve faults in time and reduce equipment downtime, but also can prevent more serious equipment damage, thereby reducing the maintenance cost and prolonging the equipment life.

The random forest model is trained based on the C4.5 algorithm, and in combination with the post-pruning strategy, overfitting is effectively avoided and the generalization capability of the model is improved. The random forest is integrated with a plurality of decision-making trees such that a deviation of a single decision-making tree is reduced and the overall determination accuracy is improved by majority voting. This enables the model to maintain efficient diagnostic performance even when facing a varying working environment and different fault types.

Although the preferred embodiments of the present disclosure have been described, those skilled in the art can make additional alterations and modifications to these embodiments once the basic inventive concepts are known. Therefore, the appended claims are intended to be construed to include the preferred embodiments and all alterations and modifications that fall within the scope of the present disclosure.

It will be apparent to those skilled in the art that various modifications and variations can be made to the present disclosure without departing from the spirit and scope of the present disclosure. Thus, provided that these alterations and modifications of the present disclosure fall within the scope of the claims of the present disclosure and their equivalents, the present disclosure is also intended to include these alterations and modifications.

What is claimed is:

1. An online fault diagnosis method for a solenoid valve based on analysis of time-frequency domain characteristics, comprising the following steps:

acquiring present timing current data, historical normal valve core timing current data, historical spring breakage timing current data, historical stuck valve core timing current data, and historical slightly stuck valve core timing current data for a solenoid valve drive end, and preprocessing the data;

performing time domain analysis and frequency domain analysis on the preprocessed present timing current data, historical normal valve core timing current data, historical spring breakage timing current data, historical stuck valve core timing current data, and historical slightly stuck valve core timing current data for the solenoid valve drive end to obtain present time domain and frequency domain feature vectors, time domain and frequency domain feature vectors for a normal valve core, time domain and frequency domain feature vectors for a broken spring, time domain and frequency domain feature vectors for a stuck valve core, and time domain and frequency domain feature vectors for a slightly stuck valve core, respectively;

performing fusion processing on the present time domain and frequency domain feature vectors, the time domain and frequency domain feature vectors for the normal valve core, the time domain and frequency domain feature vectors for the broken spring, the time domain and frequency domain feature vectors for the stuck valve core, and the time domain and frequency domain feature vectors for the slightly stuck valve core to obtain a present complex feature vector, a complex feature vector for the normal valve core, a complex feature vector for the broken spring, a complex feature vector for the stuck valve core, and a complex feature vector for the slightly stuck valve core, respectively;

establishing a vector dataset based on the complex feature vector for the normal valve core, the complex feature vector for the broken spring, the complex feature vector for the stuck valve core, and the complex feature vector for the slightly stuck valve core; and training a pre-established random forest model with the vector dataset, and diagnosing and identifying the present complex feature vector after the completion of training the random forest model;

determining a fault type of the solenoid valve based on a diagnostic identification result; and providing fault warning and maintenance recommendations based on the fault type of the solenoid valve, and performing maintenance on the solenoid valve based on the maintenance recommendations;

wherein the present timing current data for the solenoid valve drive end is specifically current values at a plurality of time points when the solenoid valve drive end is in a present state; the historical normal valve core timing current data for the solenoid valve drive end is specifically historical current values at a plurality of historical time points when the solenoid valve drive end is in a normal valve core state; the historical spring breakage timing current data for the solenoid valve drive end is specifically historical current values at a plurality of historical time points when the solenoid valve drive end is in a spring breakage state; the historical stuck valve core timing current data for the solenoid valve drive end is specifically historical current values at a plurality of historical time points when the solenoid valve drive end is in a stuck valve core state; and the historical slightly stuck valve core timing current data for the solenoid valve drive end is specifically historical current values at a plurality of historical time points when the solenoid valve drive end is in a slightly stuck valve core state;

obtaining the present time domain feature vector, the time domain feature vector for the normal valve core, the time domain feature vector for the broken spring, the time domain feature vector for the stuck valve core, and the time domain feature vector for the slightly stuck valve core specifically comprises:

separately reading preprocessed current values at the plurality of time points when the solenoid valve drive end is in the present state and preprocessed historical current values at the plurality of historical time points when the solenoid valve is in the normal valve core state, in the spring breakage state, in the stuck valve core state, and in the slightly stuck valve core state, and performing mean value analysis and arrangement in a descending order on the current values to obtain a current mean value, a current effective value, a maximum current value, and a minimum current value in the present state, and current mean values, current effective values, maximum current values, and minimum current values in the normal valve core state, the spring breakage state, the stuck valve core state, and the slightly stuck valve core state, respectively;

performing difference analysis on the maximum current value and the minimum current value in the present state, and the maximum current values and the minimum current values in the normal valve core state, the spring breakage state, the stuck valve core state, and the slightly stuck valve core state to obtain a current extreme difference value in the present state, and current extreme difference values in the normal valve core state, the spring breakage state, the stuck valve core state, and the slightly stuck valve core state, respectively; and establishing the present time domain feature vector, the time domain feature vector for the normal valve core, the time domain feature vector for the broken spring, the time domain feature vector for the stuck valve core, and the time domain feature vector for the slightly stuck valve core based on the current mean value, the current effective value, and the current extreme difference value in the present state, and the current mean values, the current effective values, and the current extreme difference values in the normal valve core state, the spring breakage state, the stuck valve core state, and the slightly stuck valve core state, respectively; and obtaining the present frequency domain feature vector, the frequency domain feature vector for the normal valve core, the frequency domain feature vector for the broken spring, the frequency domain feature vector for the stuck valve core, and the frequency domain feature vector for the slightly stuck valve core specifically comprises:

separately reading preprocessed current values at the plurality of time points when the solenoid valve drive end is in the present state and preprocessed historical current values at the plurality of historical time points when the solenoid valve is in the normal valve core state, in the spring breakage state, in the stuck valve core state, and in the slightly stuck valve core state, and performing second derivative analysis on the current values to obtain second-order derivatives in the present state, the normal valve core state, the spring breakage state, the stuck valve core state, and the slightly stuck valve core state, respectively;

performing binary discrete wavelet packet decomposition on the second-order derivatives in the present state, the normal valve core state, the spring breakage state, the stuck valve core state, and the slightly stuck valve core state to obtain wavelet functions in the present state, the normal valve core state, the spring breakage state, the stuck valve core state, and the slightly stuck valve core state, respectively;

performing energy analysis on the wavelet functions in the present state, the normal valve core state, the spring breakage state, the stuck valve core state, and the slightly stuck valve core state to obtain energy values in the present state, the normal valve core state, the spring breakage state, the stuck valve core state, and the slightly stuck valve core state, respectively; and performing normalization processing on the energy values in the present state, the normal valve core state, the spring breakage state, the stuck valve core state, and the slightly stuck valve core state to obtain normalized energy features in the present state, the normal valve core state, the spring breakage state, the stuck valve core state, and the slightly stuck valve core state, respectively, which are denoted as the present frequency domain feature vector, the frequency domain feature vector for the normal valve core, the frequency domain feature vector for the broken spring, the frequency domain feature vector for the stuck valve core, and the frequency domain feature vector for the slightly stuck valve core, respectively.

2. The online fault diagnosis method for a solenoid valve based on analysis of time-frequency domain characteristics according to claim 1, wherein specific formulas for calculating the current mean value, the current effective value, and the current extreme difference value in the present state are as follows:

$$\begin{cases} \overline{I} = \frac{1}{n} * (i_1 + i_2 + \cdots + i_k + \cdots + i_n) \\ I' = \sqrt{\frac{1}{n} * (i_1^2 + i_2^2 + \cdots + i_k^2 + \cdots + i_n^2)} \\ R = i^{Max} - i^{Min} \end{cases} ;$$

wherein $\bar{I}$ represents the current mean value in the present state; $i_k$ represents a current value at a k-th time point when the solenoid valve drive end is in the present state; $i_n$ represents a current value at an n-th time point when the solenoid valve drive end is in the present state, 2<k<n, n being a total number of time points; I' represents the current effective value in the present state; R represents the current extreme difference value in the present state; $i^{Max}$ represents the maximum current in the present state; and $i^{Min}$ represents the minimum current value in the present state.

3. The online fault diagnosis method for a solenoid valve based on analysis of time-frequency domain characteristics according to claim 1, wherein specific formulas for calculating the wavelet function, the energy value, and the normalized energy feature in the present state are as follows:

$$\begin{cases} \psi_{jt}(t) = \frac{1}{\sqrt{2^g}} * \psi\left(\frac{t}{2^g} - r\right) \\ X_{jt} = \int_{-\infty}^{+\infty} [\Delta i''(t) * \psi_{jt}(t)]dt \\ e_j = \sum_{r=1}^{Q} X_{jt}^2 \\ E_j = \frac{e_j}{\sqrt{\sum_{g=1}^{s} e_j}} \end{cases} ;$$

wherein $\psi_{jr}(t)$ represents a wavelet function of an r-th quantity of an j-th layer of wavelet decomposition in the present state; g represents a scale parameter of wavelet transform, g=1, 2, 3 . . . , s, s being a maximum scale, and 1≤s≤j; r represents a position parameter of wavelet transform; $\Delta i''(t)$ represents a second-order derivative in the present state; $X_{jr}$ represents a coefficient obtained by wavelet transform in the present state; $e_j$ represents an energy value of a j-th layer of wavelet decomposition in the present state, representing an energy sum of wavelet coefficients of all positions of the j-th layer, r=1, 2, 3 . . . , Q, Q being a total number of positions; and $E_j$ represents the normalized energy feature of the j-th layer of wavelet decomposition in the present state.

4. The online fault diagnosis method for a solenoid valve based on analysis of time-frequency domain characteristics according to claim 1, wherein the training a pre-established random forest model with the vector dataset specifically comprises training by using a C4.5 algorithm, namely sampling the vector dataset to generate a plurality of decision-making trees to constitute the random forest model.

5. The online fault diagnosis method for a solenoid valve based on analysis of time-frequency domain characteristics according to claim 4, wherein generating the plurality of decision-making trees specifically comprises:
reading the vector dataset, and randomly extracting a plurality of sets of data, and separately establishing random vector datasets;
dividing the random vector dataset of each set of data into a vector training dataset and a vector verifying dataset;
for each set of data, segmenting the vector training dataset from a root node using a feature having a highest information gain ratio, and repeating the process for each resulting subset to establish a tree recursively;
stopping establishing when a preset stop condition is met; and
for the established tree, using a post-pruning strategy that is carried out after the tree has been completely established, and evaluating and adjusting the tree before and after pruning using the vector verifying dataset until the tree meets an expected standard.

6. The online fault diagnosis method for a solenoid valve based on analysis of time-frequency domain characteristics according to claim 1, wherein in the diagnosing and identifying of the present complex feature vector after the completion of training the random forest model, the random forest model diagnoses a fault by majority voting to obtain a final result.

\* \* \* \* \*